US011384844B2

(12) United States Patent
Karlsen

(10) Patent No.: US 11,384,844 B2
(45) Date of Patent: Jul. 12, 2022

(54) VALVE SEAL DEVICE

(71) Applicant: Sil Valves AS, Hjellestad (NO)

(72) Inventor: Frode Ivar Karlsen, Hjellestad (NO)

(73) Assignee: Sil Valves AS, Hjellestad (NO)

(*) Notice: Subject to any disclaimer, the term of this patent is extended or adjusted under 35 U.S.C. 154(b) by 0 days.

(21) Appl. No.: 16/623,908

(22) PCT Filed: Jun. 19, 2018

(86) PCT No.: PCT/NO2018/050166
§ 371 (c)(1),
(2) Date: Dec. 18, 2019

(87) PCT Pub. No.: WO2018/236223
PCT Pub. Date: Dec. 27, 2018

(65) Prior Publication Data
US 2020/0232564 A1    Jul. 23, 2020

(30) Foreign Application Priority Data

Jun. 19, 2017    (NO) .................................. 20171002

(51) Int. Cl.
| F16K 3/20 | (2006.01) |
| F16K 3/02 | (2006.01) |
| F16K 5/06 | (2006.01) |
| F16K 5/20 | (2006.01) |
| F16K 41/02 | (2006.01) |

(52) U.S. Cl.
CPC ............ *F16K 3/207* (2013.01); *F16K 3/0227* (2013.01); *F16K 5/0694* (2013.01); *F16K 5/201* (2013.01); *F16K 5/205* (2013.01); *F16K 41/02* (2013.01); *F16K 41/026* (2013.01); *F16K 5/0673* (2013.01)

(58) Field of Classification Search
CPC .......... F16K 3/207; F16K 3/20; F16K 3/0227; F16K 5/201; F16K 5/205; F16K 5/0673
See application file for complete search history.

(56) References Cited

U.S. PATENT DOCUMENTS

| 3,181,552 A | 5/1965 | Jackson |
| 3,504,885 A * | 4/1970 | Hulsey ................. F16K 5/0673 |
| | | 251/172 |

(Continued)

FOREIGN PATENT DOCUMENTS

| CA | 3014510 A1 * | 8/2017 | ........... F16K 5/0678 |
| CN | 201954026 | 8/2011 | |

(Continued)

OTHER PUBLICATIONS

Norwegian Search Report for No. 20171002, dated Jan. 22, 2018.

(Continued)

*Primary Examiner* — David Colon-Morales
(74) *Attorney, Agent, or Firm* — Andrus Intellectual Property Law, LLP

(57) ABSTRACT

A valve seal device is for a valve in a pipeline. The valve seal device has four moveable seats configured for sealingly contacting a valve member, two seats being positioned on each side of the valve member. At least one of the moveable seats on each side of the valve member is an actuation seat being controllable from a non-contact position to a contact position where it seals against the valve member.

12 Claims, 5 Drawing Sheets

(56) References Cited

U.S. PATENT DOCUMENTS

| | | | |
|---|---|---|---|
| 3,533,597 A * | 10/1970 | Bolling | F16K 5/201 251/174 |
| 3,565,392 A * | 2/1971 | Bryant | F16K 5/205 251/159 |
| 3,610,569 A * | 10/1971 | Reaves | F16K 3/207 251/52 |
| 3,749,357 A * | 7/1973 | Fowler | F16K 5/188 251/172 |
| 3,776,506 A | 12/1973 | Fowler et al. | |
| 3,901,474 A * | 8/1975 | Kubota | F16K 5/14 251/159 |
| 3,912,220 A * | 10/1975 | Vasicek | F16K 5/205 251/159 |
| 4,083,376 A * | 4/1978 | Alaniz | F16K 3/207 137/246.22 |
| 4,266,566 A * | 5/1981 | Kacal | F16K 5/201 137/316 |
| 4,273,309 A * | 6/1981 | Morrison | F16K 5/0673 251/174 |
| 4,340,204 A | 7/1982 | Herd | |
| 4,390,039 A * | 6/1983 | Johnson | F16K 5/0636 137/315.21 |
| 4,483,511 A * | 11/1984 | Kushida | F16K 5/201 251/172 |
| 4,747,578 A * | 5/1988 | Kivipelto | F16K 5/207 251/159 |
| 4,878,651 A * | 11/1989 | Meyer, Jr. | F16K 3/0236 251/172 |
| 5,090,661 A * | 2/1992 | Parks, Jr | F16K 3/16 251/172 |
| 5,101,853 A * | 4/1992 | Mailliet | B65G 53/46 137/242 |
| 5,322,261 A | 6/1994 | Aarnes | |
| 5,341,835 A * | 8/1994 | Lanning, II | F16K 3/0227 137/246.22 |
| 5,445,359 A * | 8/1995 | Beson | F16K 3/205 251/159 |
| 5,533,738 A | 7/1996 | Hoffmann | |
| 5,624,101 A * | 4/1997 | Beson | F16K 5/201 251/172 |
| 6,340,029 B1 * | 1/2002 | Jun | F16K 1/228 137/1 |
| 6,669,171 B1 * | 12/2003 | Stunkard | F16K 5/0642 251/315.08 |
| 7,032,880 B2 * | 4/2006 | Scaramucci | F16K 5/0673 251/172 |
| 8,210,500 B2 * | 7/2012 | Song | F16K 25/04 251/315.01 |
| 9,915,359 B2 * | 3/2018 | Ricard | F16K 5/0673 |
| 10,030,784 B2 * | 7/2018 | Lanning | F16K 5/0689 |
| 10,197,168 B1 * | 2/2019 | Whitlow | F16K 5/0689 |
| 2014/0239212 A1 | 8/2014 | Haland | |
| 2015/0300509 A1 * | 10/2015 | He | F16K 5/201 251/174 |

FOREIGN PATENT DOCUMENTS

| | | | |
|---|---|---|---|
| DE | 2131643 | 1/1973 | |
| DE | 2556729 A1 * | 7/1976 | F16K 5/14 |
| DE | 2746609 A1 * | 4/1979 | F16K 3/207 |
| DE | 102015110113 | 12/2016 | |
| FR | 2940828 A1 * | 7/2010 | F16K 5/14 |
| JP | S52136425 | 11/1977 | |
| JP | S55149462 | 11/1980 | |
| JP | H02129471 | 5/1990 | |
| JP | H08135809 | 5/1996 | |
| JP | H08303616 | 11/1996 | |
| WO | 9119921 | 12/1991 | |
| WO | WO-2017158077 A1 * | 9/2017 | E21B 29/08 |

OTHER PUBLICATIONS

International Search Report for PCT/NO2018/050166, dated Jan. 14, 2019.
Written Opinion for PCT/NO2018/050166, dated Jan. 14, 2019.
Response to the Written Opinion for PCT/NO2018/050166, dated May 31, 2019.
Written Opinion for PCT/NO2018/050166, dated Jun. 24, 2019.
International Preliminary Report on Patentability for PCT/NO2018/050166, dated Sep. 16, 2019.

* cited by examiner

VALVE SEAL DEVICE

CROSS-REFERENCE TO RELATED APPLICATIONS

This application is the U.S. national stage application of International Application PCT/NO2018/050166, filed Jun. 19, 2018, which international application was published on Dec. 27, 2018, as International Publication WO 2018/236223 in the English language. The International Application claims priority of Norwegian Patent Application No. 20171002, filed Jun. 19, 2017. The international application and Norwegian application are both incorporated herein by reference, in entirety.

FIELD OF THE INVENTION

The invention relates to a valve seal device, and more particular to a valve seal device for a valve in a pipeline.

BACKGROUND OF THE INVENTION

Most valves, for example for use in pipelines for transporting liquids and gases, comprises a valve member which, upon rotation (e.g. a ball valve) or directional movement (e.g. a slab gate valve), undergoes relative sliding with the valve seat. Such relative sliding accounts for significant wear and tear of the valve member and the seats, and reduces the longevity of the valve.

In order to overcome the problem related to unwanted wear and decreased longevity of the valve, some valves have been devised which are equipped with a retractable seat.

WO 91/19921 A1 describes a valve arrangement in particular for a large ball valve, comprising a movable seat or seal holder.

U.S. Pat. No. 5,533,738 describes an apparatus for sealing shut-off devices located in gas or liquid transporting pipelines having a sealing arrangement having a gasket engageable against the circumferential surface of the shut-off device.

However, known valve devices still struggle with the longevity of the valve, and if a failure occurs and the movable seat or seal holder fails, the valves are at risk of leaking. Such known valves are not safe enough to be used in high-risk applications like nuclear industry, and there is still a considerable cost related to existing, fail-safe valves.

SUMMARY OF THE INVENTION

The objective of the present invention is to provide a valve seal device which increases the integrity of a valve and at the same time increases the longevity of the valve, such that the valve could last longer than the offshore platform or subsea unit it could be mounted on. Due to the high integrity, one valve with such a valve seal device could replace two standard valves, and thus the valve seal device is both cheaper and has a significant longer lifespan than conventional valves.

In accordance with the present invention, there is provided a valve seal device for a valve in a pipeline, comprising four moveable seats configured for sealingly contacting a valve member, two seats are positioned on each side of the valve member, at least one of the moveable seats on each side of the valve member is an actuation seat being controllable from a non-contact position to a contact position where it seals against the valve member According to another embodiment of the invention, the actuation seats on both sides of the valve member are independently controllable to eliminate downstream and upstream pressure effects.

According to another embodiment of the invention, the at least one actuation seat is arranged to interact with an adjacent moveable seat, thereby controlling the positioning of the adjacent moveable seat relative to the valve member.

According to another embodiment of the invention, a protrusion or recess on the at least one actuation seat arranged to interact with an adjacent moveable seat interacts with a corresponding recess or protrusion on the adjacent moveable seat to control the position of the adjacent moveable seat relative to the valve member.

According to another embodiment of the invention, a sealing seals between the actuation seat and an adjacent movable seat.

According to another embodiment of the invention, the movable seats which are not actuation seats excerpt contact pressure on the valve member by means of springs.

According to another embodiment of the invention, the at least one actuation seat is actuated by hydraulic pressure.

According to another embodiment of the invention, the at least one actuation seat is positioned on the outside of an adjacent moveable seat.

According to another embodiment of the invention, the at least one actuation seat is positioned on the inside of an adjacent moveable seat.

According to another embodiment of the invention, the at least one movable seat which is not an actuation seat is positioned on the outside of the actuation seat and the movable seat is arranged to be exposed to a double piston effect.

According to another embodiment of the invention, for use in a bi-directional valve.

In accordance with the present invention, there is also provided a valve stem seal device for a valve in a pipeline, comprising three barriers for sealingly contacting a valve stem, two of the barriers are actuation seals being controllable from a non-contact state to a contact state where they seal tight around the circumference of the valve stem.

According to another embodiment of the invention, a first barrier is a static sealing.

According to another embodiment of the invention, a second barrier is a compression seal.

According to another embodiment of the invention, a packing gland is configured to compress the compression seal in a direction along the stem into the contact state.

According to another embodiment of the invention, the packing gland is configured to compress the compression seal into the contact state by means of spring force.

According to another embodiment of the invention, the packing gland is configured to be retracted by means of a hydraulic pressure from the compression seal to control the compression seal from a contact state to a non-contact state.

According to another embodiment of the invention, a third barrier is an actuation seal configured to move from the non-contact state in a radial direction towards the stem to the contact state.

According to another embodiment of the invention, the actuation seal is configured to move in a radial direction towards the stem from two opposite sides of the stem.

According to another embodiment of the invention, the actuation seal is hydraulically actuated.

BRIEF DESCRIPTION OF THE DRAWINGS

These and other characteristics of the invention will become clear from the following description of embodiment(s), given as non-restrictive examples, with reference to the attached schematic drawings.

DETAILED DESCRIPTION OF PREFERRED EMBODIMENTS

Figure 1A:
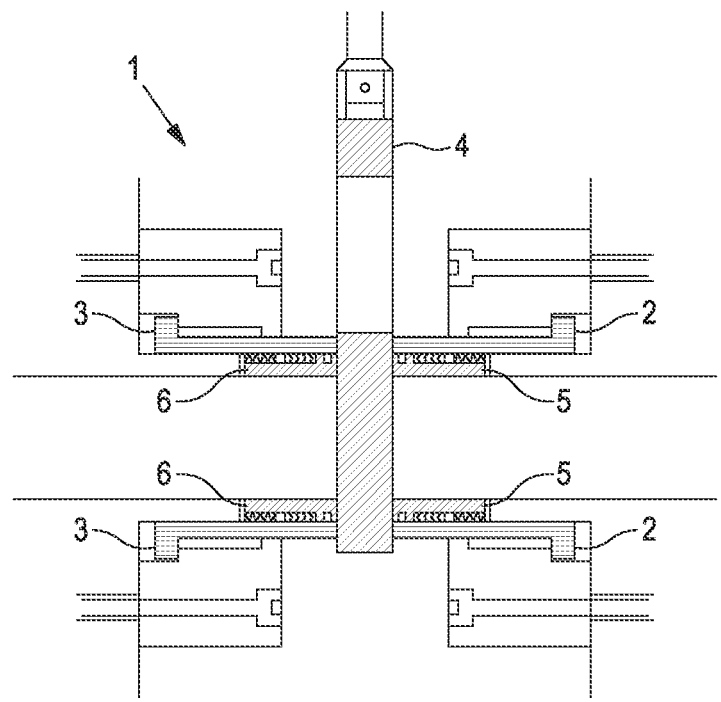
FIG. 1a is a partial section view of a slab gate valve device in a closed position with closed seats

The following description may use terms such as "horizontal", "vertical", "lateral", "back and forth", "up and down", "upper", "lower", "inner", "outer", etc. These terms generally refer to the views and orientations as shown in the drawings and that are associated with a normal use of the invention. The terms are used for the reader's convenience only and shall not be limiting.

FIGS. 1a to 1d shows a sequence of opening a slab gate valve device 1. The different components of the slab gate valve device 1, and how they operate, are explained more in detail with reference to FIG. 2. The entire valve is not shown, only the internal components necessary to achieve the intended effect are illustrated. The shown principles could be applied to any similarly functioning valves.

In FIG. 1a, the slab gate valve device 1 is in a fully closed position, and movable actuation seats 2, 3 are actuated hydraulically, pneumatically, electrically or by other means known in the art to contact and seal against the slab gate 4. Movable, mechanical seats 5, 6 are also biased against the slab gate 4 by means of a spring and pressure build-up, as is commonly known in the art.

Figure 1B:
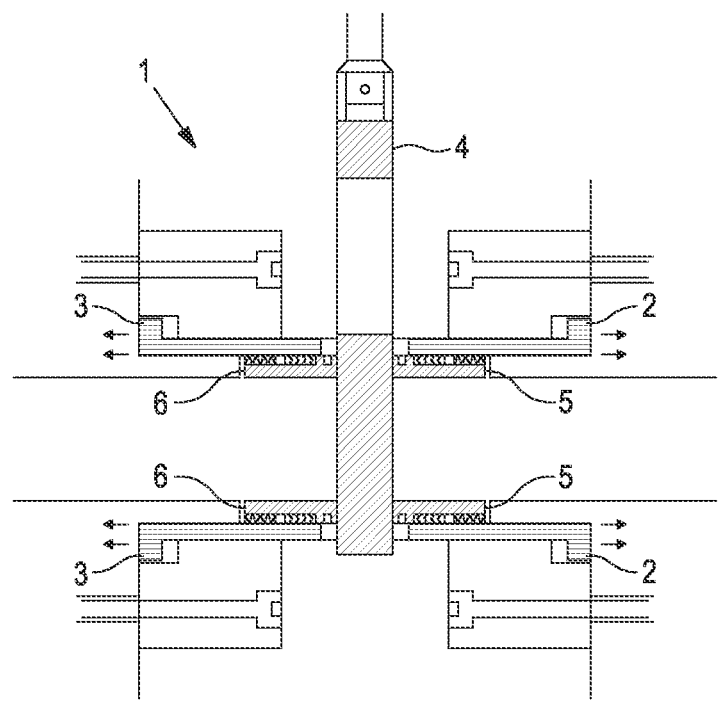
FIG. 1b is a partial section view of a slab gate valve device in a closed position with open seats

In FIG. 1b, the actuation seats 2, 3 are moved away from the slab gate 4 into a non-contact, retracted position, such that there is no contact between the actuation seats 2, 3 and the slab gate 4. The mechanical seats 5, 6 are still biased against the slab gate 4, as is common in the art.

Figure 1C:
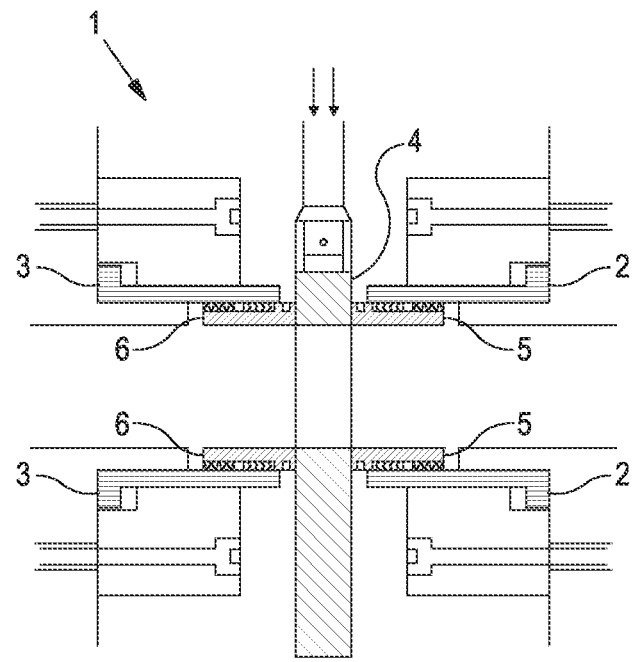
FIG. 1c is a partial section view of a slab gate valve device in an open position with open seats

In FIG. 1c, the slab gate 4 is moved downwards into the fully closed position, while the actuation seats 2, 3 are held in the retracted position and the mechanical seats 5, 6 are in contact the slab gate 4.

Figure 1D:
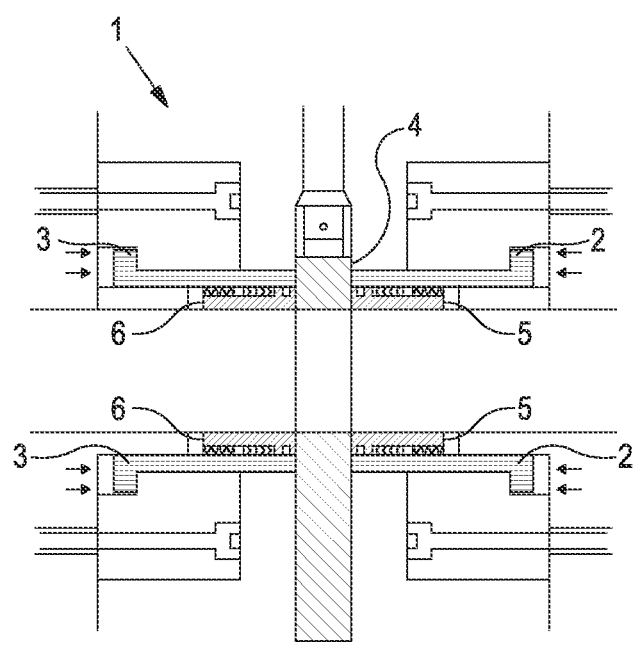
FIG. 1d is a partial section view of a slab gate valve device in an open position with closed seats

In FIG. 1d, the actuation seats 2, 3 are moved back into the initial position where they contact and bias the slab gate 4 in order to ensure a leak-tight sealing with the slab gate 4. The mechanical seats 5, 6 also bias the slab gate 4, and the slab gate valve device 1 is in FIG. 1d fully open with four sealing seats.

In order to close the valve 1, an opposite sequence can be performed, as will be appreciated by the skilled person. A similar sequence as is shown in FIGS. 1a-1d is also applicable for a ball valve, where, instead of lowering or raising a slab gate 4, the ball of a ball valve is turned. The valve device thus functions as a non-contact valve device.

Figure 2:
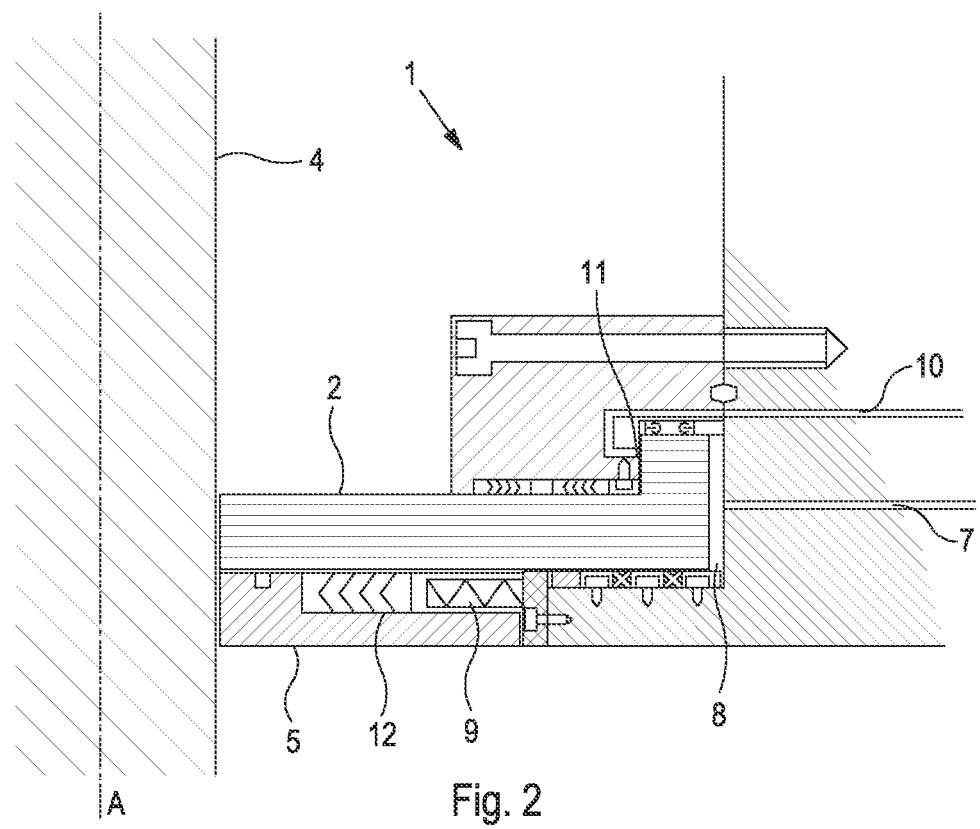
FIG. 2 is a partial, detail section view of a slab gate valve device with four seats

FIG. 2 shows a detailed section view of a quarter of a slab gate valve device 1. FIG. 2 illustrates the upper right quarter of the slab gate valve device 1 from FIGS. 1a-1d, and because of symmetry, the valve sides upstream and downstream of the slab gate could be substantially symmetrical. An axis A through the center of the slab gate 4 and the slab gate valve device 1 is indicated in the figure; this is also a symmetry axis A.

As is commonly known in the art, a movable, mechanical seat 5 is forced towards the slab gate 4 by means of springs 9.

Hydraulic pressure could be applied to the slab gate valve device 1 e.g. via a first hydraulic channel 7. The first channel 7 leads to a first chamber 8 positioned on a rear side of the actuation seat 2, and as such, a pressure build-up in the first chamber 8 results in the actuation seat 2 being forced towards the slab gate 4 (i.e. towards the left in FIG. 2). The actuation seat 2 is forced forwards until it contacts and seals tightly with the slab gate 4. The force added to the seat 2 in the closed position must be within the elastic deformation of the actuation seat 2 and gate 4. This can be regulated with a pressure regulating valve (not shown) for the supply of the force to the actuation seat 2. Preferably, a safety relief valve positioned after the regulating valve will make it virtually impossible to add a pressure and force which exceeds the elastic deformation limit of the materials.

In order to retract the movable actuation seat 2, the pressure in first channel 7 and first chamber 8 is relieved, and a hydraulic pressure is applied e.g. through a second channel 10 in connection with a second chamber 11 positioned on a front side of the actuation seat 2, and as such, a pressure build-up in the second chamber 11 results in the actuation seat 2 being pulled away from the slab gate 4 (i.e. towards the right in FIG. 2), ensuring no physical contact between the actuation seat 2 and the slab gate 4.

The mechanical seat 5 is positioned on the inside (in a radial direction) of the actuation seat 2, as can be seen in FIG. 2. The mechanical seat 5 is forced towards the slab gate 4 by means of several springs 9, as is commonly known in the art. The springs 9 apply an even pressure on the mechanical seat 5, and the spring force is constant even if the slab gate 4 is open, closed, or moving between an open and closed state. In the illustrated embodiment, sealing 12 ensure a leak-tight fit between the actuation seat 2 and the mechanical seat 5. In this embodiment, the back and forth-movement of the actuation seat 2 will not affect the position of the mechanical seat 5.

A slab gate is forced towards the seat on the downstream side of the valve, and thus the slab gate seals tightly against the seat on the downstream side. Pressure in cavities of the valve forces the upstream seat against the slab gate such that also this sealing is tight. However, when there is a small difference in pressure between the upstream side and downstream side of the slab gate 4, there is a risk that the actuation seat 2 may force the slab gate 4 from the seat on the downstream side, such that a leak occurs between the downstream seat and the slab gate. In order to avoid this, the hydraulic pressure on both sides of the slab gate 4 can be controlled independently, such that at a low pressure difference, the hydraulic pressure on the downstream side can be reduced compared to the upstream side. This effectively eliminates downstream and upstream pressure effects, and prevents leakage between the slab gate and the seats, and renders the valve equally effective as a bi-directional valve.

Figure 3:
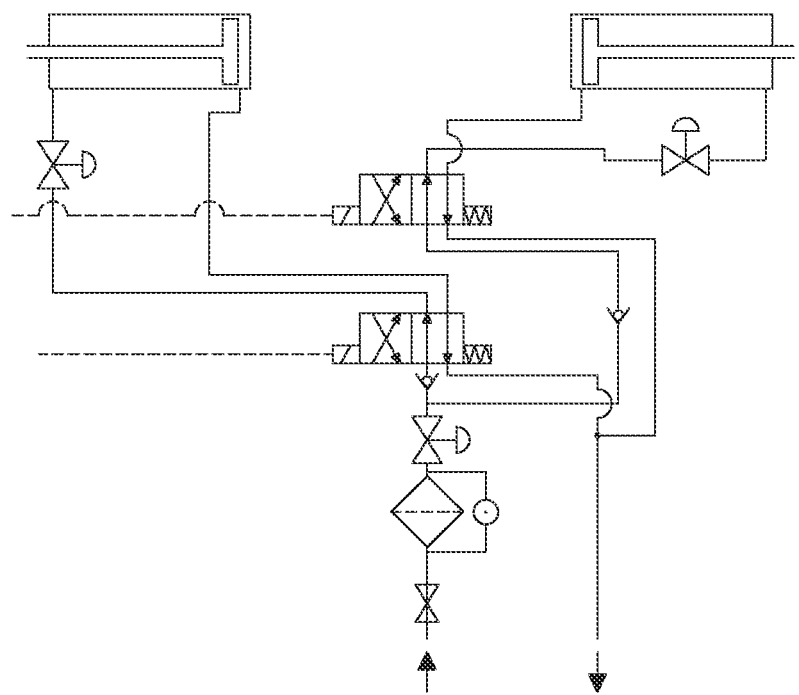
FIG. 3 is a schematic valve drawing of a valve device for a slab gate

See also FIG. 3 for a schematic figure for such a set-up. FIG. 3 shows that a first pressure reduction valve reduces the hydraulic pressure in order to secure that a seat is within the elastic deformation of the gate and seat. The regulating valve on each side ensure that the actuating seat do not push the gate from sealing against the downstream seat. In the figure, three regulating valves are illustrated.

Sensors (not shown) could be installed in various locations in order to increase the integrity on the valve, and to accurately indicate the amount of opening or closing of the valve. Sensors could also be installed in order to give the position of each seat.

In the event that any of the seats fail, the actuator supplying the hydraulic pressure is sized in order to operate the valve with calculated full pressure on seats with the required safety factor.

In order to further increase the integrity of the valve, there could be a programmed time limit in order to operate the valve device 1 without sensors giving the signal that the seats are in the right position in order to operate the valve in either open or closed position.

In an alternative embodiment, the actuation seat can be equipped with a small protrusion or recess (not shown). This protrusion or recess interacts with a corresponding protrusion or recess on the mechanical seat, such that when the actuation seat is e.g. retracted from the slab gate 4, the mechanical seat will follow, and thus behave like a slave seat. When the actuation seat is actuated to seal the gate, the slave seat will also follow. Typically, the protrusion or recess on the mechanical seat could allow the actuation seat to move a short distance before contact is established between the actuation seat and the slave seat. In such an embodiment, the slab gate valve would thus comprise four controllable actuation seats. All seats in this embodiment are therefore non-contact seats, i.e. there will be no contact between the seats and the gate or ball when the valve moves from closed to open or from open to close. This will greatly reduce wear during operation of the valve which will result in increased lifetime of the valve.

Figure 4:
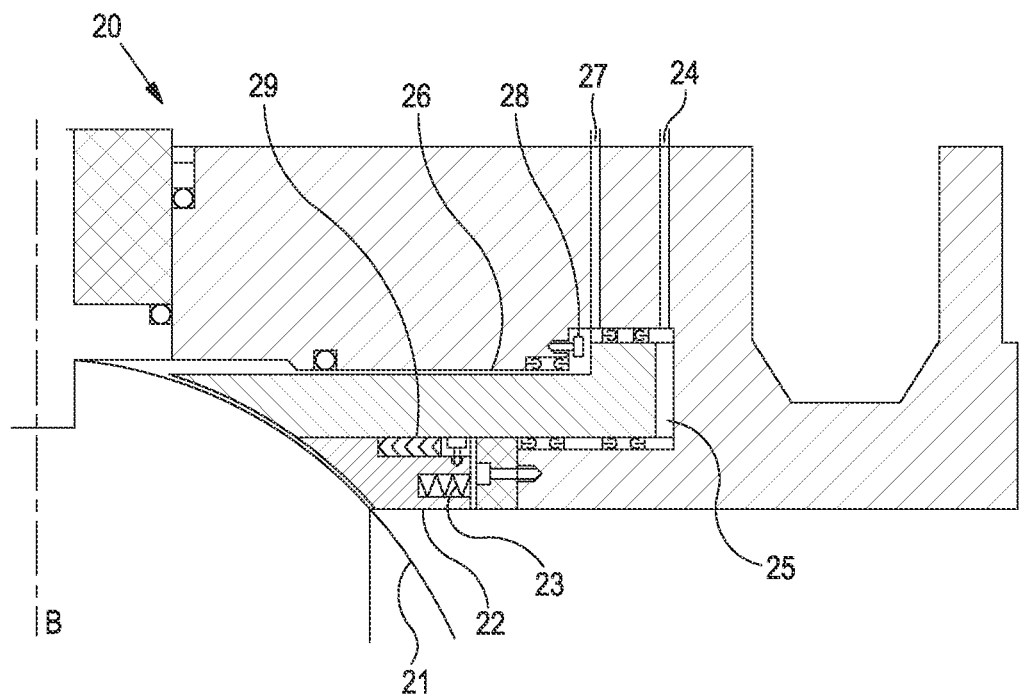
FIG. 4 is a partial, detail section view of a first embodiment of a ball valve device with four seats

FIG. 4 shows a valve device 20 similar to that which has been explained with reference to FIG. 2, but in this embodiment the device is applied to a ball valve. FIG. 4 illustrates the upper right quarter of a ball valve device, and an axis B through the center of the ball 21 and the ball valve device 20 is indicated in the figure; this is also a symmetry axis B. A movable, mechanical seat 22 is positioned on the inside (in a radial direction) of a movable, actuation seat 26, as can be seen in the figure. The mechanical seat 22 is biased against the ball 21 by means of several springs 23, as is commonly known in the art. The springs 23 apply an even pressure on the mechanical seat 22, and this pressure is constant even if the ball 21 is in an open or closed position, and even when the ball is rotated between the open and closed state.

Hydraulic pressure could be applied to the ball valve device 20 e.g. via a first hydraulic channel 24. This first channel 24 leads to a first chamber 25 positioned on a rear side of the actuation seat 26, and as such, a pressure build-up in the first chamber 25 results in the actuation seat 26 being forced towards the ball 21 (i.e. towards the left in FIG. 4). The actuation seat 26 is forced forwards until it contacts and seals tightly with the ball 21. The force added to the actuation seat 26 in the closed position must be within the elastic deformation of the actuation seat 26 and ball 21. This can be regulated with a pressure regulating valve (not shown) for the supply of the force to the actuation seat 26. Preferably, a safety relief valve positioned after the regulating valve will make it virtually impossible to add a pressure and force which exceeds the elastic deformation limit of the materials. The actuation seat 26 could also be actuated pneumatically, electrically or by other means known in the art.

In order to retract the actuation seat 26, the pressure in first channel 24 and first chamber 25 is relieved, and a hydraulic pressure is applied e.g. through a second channel 27 connected to a second chamber 28 positioned on a front side of the actuation seat 26, and as such, a pressure build-up in the second chamber 28 results in the actuation seat 26 being pushed away from the ball 21 (i.e. towards the right in FIG. 4), ensuring no physical contact between the actuation seat 26 and the ball 21.

In the illustrated embodiment, sealing 29 ensure a leak-tight fit between the actuation seat 26 and the mechanical seat 22. The back and forth-movement of the actuation seat 26 will not affect the position of the mechanical seat 22.

As explained with reference to FIG. 2, sensors could also be provided with the ball valve in FIG. 4. In an alternative embodiment, the actuation seat can be equipped with a small protrusion or recess (not shown), also as described with reference to FIG. 2.

The ball valve device 20 can be used as a bi-directional valve, however, the mechanical seat 22 located on a downstream side of the valve will only seal sufficiently against the ball 21 under low pressure differences of approximately 6-7 bar. Under such pressure difference the springs 23 are sufficient to force the mechanical seat 22 against the ball 21 such that there is a tight sealing. When the pressure difference rises above approximately 6-7 bar, the downstream mechanical seat 22 will be forced away from the ball 21 due to the pressure, and as such, only three barriers (seats) will seal the valve. This effect also known as cavity release.

In order to overcome the potentially unwanted effect of having a bi-directional valve with only three barriers during certain circumstances, a ball valve as shown in FIG. 4 which is both bi-directional and has four seats in sufficient contact with the ball under any pressure difference has been devised.

Figure 5:
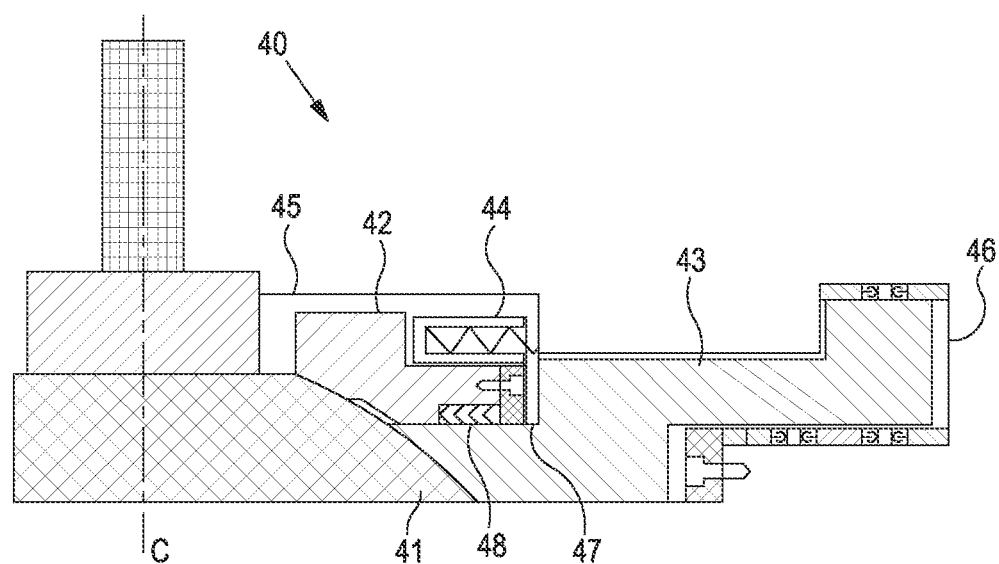
FIG. 5 is a partial, detail section view of a second embodiment of a ball valve device with four seats

FIG. 5 illustrates the upper right quarter of a ball valve device 40. An axis C through the center of the ball 41 and the ball valve device 40 is indicated in the figure; this is also a symmetry axis C. In this embodiment, the mechanical seat 42 is positioned on the outside (in a radial direction) of the actuation seat 43, as can be seen in the figure.

The mechanical seat 42 is biased against the ball 41 by means of several springs 44, as is known in the art. The springs 44 apply an even pressure on the mechanical seat 42, and this spring force is constant even if the ball 41 is in an open or closed position, and even when the ball 41 is rotated between the open and closed state.

The mechanical seat 42 is in this embodiment exposed to a so-called double piston effect. If a leakage into the cavity of the valve occurs, the pressure in chamber 45 will increase, and the mechanical seat 42 is forced against the ball 41. A metal sealing seat has an accepted rate of leakage and, over time, a pressure build-up can occur in the cavity of the valve. The configuration in FIG. 5 utilizes this pressure to force the mechanical seat 42 to the ball 41.

As explained in relation to the previous embodiment, hydraulic pressure could be applied to the ball valve device 40 e.g. into a first chamber 46 positioned on a rear side of the actuation seat 43, and as such, a pressure build-up in the first chamber 46 results in the actuation seat 43 being forced towards the ball 41 (i.e. towards the left in FIG. 5). The actuation seat 43 is forced forwards until it contacts and seals tightly with the ball 41. The force added to the seat 43 in the closed position must be within the elastic deformation of the actuation seat 43 and ball 41. This can be regulated with a pressure regulating valve (not shown) for the supply of the force to the actuation seat 43. Preferably, a safety relief valve positioned after the regulating valve will make it virtually impossible to add a pressure and force which exceeds the elastic deformation limit of the materials. The actuation seat 43 could also be actuated pneumatically, electrically or by other means known in the art.

In order to retract the actuation seat 43, the pressure in the first chamber 46 is relieved, and a hydraulic pressure is applied e.g. into a second chamber 47 positioned on a front side of the actuation seat 43, and as such, a pressure build-up in the second chamber 47 results in the actuation seat 43 being pushed away from the ball 41 (i.e. towards the right in FIG. 5), ensuring no physical contact between the actuation seat 43 and the ball 41.

In the illustrated embodiment, sealing 48 ensure a leak-tight fit between the actuation seat 43 and the mechanical seat 42. The back and forth-movement of the actuation seat 43 will not affect the position of the mechanical seat 42.

As explained with reference to FIGS. 2 and 4, sensors could also be provided with the ball valve of FIG. 5. In an alternative embodiment, the actuation seat can be equipped with a small protrusion or recess (not shown), as described with reference to FIGS. 2 and 4.

A ball valve with a seal device could also comprise different combinations of seal devices according to the abovementioned descriptions, depending on which demands the valve must satisfy. One configuration could be e.g. one side (upstream or downstream) of the valve could have one actuated seat and one mechanical seat according to the FIG. 4 description, while the other side of the valve could have one actuated seat and one mechanical seat arranged to be exposed to the double piston effect according to the FIG. 5 description. Alternatively, all four seats could be of the actuation type, or two seats on one side could be actuation seats, and only one on the opposite side of the ball or gate could i.e. be an actuation seat, etc. In yet another embodiment, all four seats could be made non-contact, i.e. the actuated seats comprises a protrusion or recess which interacts with the mechanical seats and as such none of the seats are in contact with the ball when the ball is turned.

Figure 6:
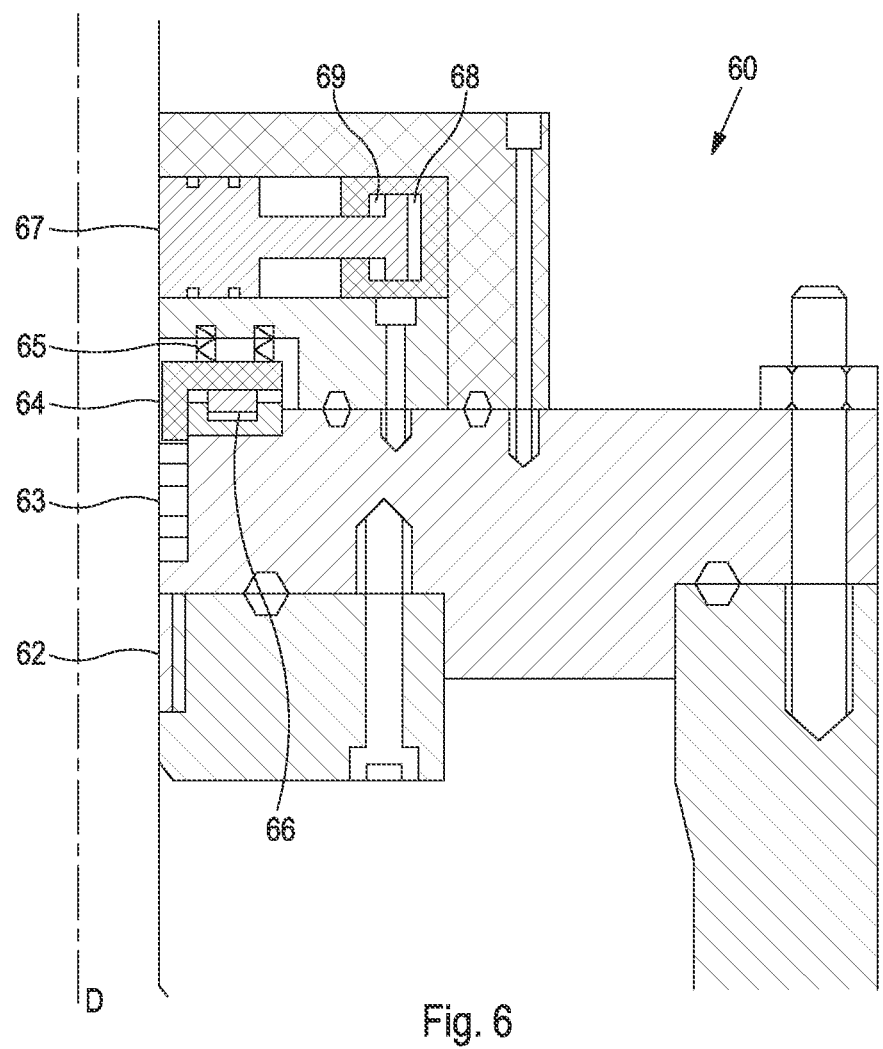
FIG. 6 is a partial section view of three barriers along a valve stem

FIG. 6 shows a stem seal device 60 for sealing the stem of a valve, such as the stem of a slab gate, a ball, etc. The right half of the stem seal device 60 is shown in FIG. 6, and the symmetry axis D represents both the symmetry axis for the valve and the center of the stem 61.

The stem seal device may comprise a first barrier, a sealing 62, in FIG. 6 this is positioned closest to the valve center, i.e. closest to the slab gate or ball. The first barrier 62 is a static sealing which is in contact with and seals tightly around the circumference of the stem 61 at any time, as is commonly known in the art.

The stem seal device 60 further comprises a second barrier, a compression seal 63, which is an actuation seal. The compression seal 63 is a circular seal which is positioned around the circumference of the stem 61. Springs 65 force a packing gland 64 towards the compression seal 63 when the packing gland 64 is not actuated. The packing gland 64 is circular and positioned around the circumference of the stem 61. The packing gland 64 moves in a direction along the length of the stem 61. A hydraulic or pneumatic pressure could also be applied to force the packing gland 64 towards the compression seal 63 instead of springs, as a skilled person would appreciate. When the compression seal 63 is compressed by the packing gland 64, the compression seal 63 expands in the radial direction, i.e. to the left and right in FIG. 6, thereby exerting a force on the stem 61 and thus creating a tight sealing between the stem 61 and the stem seal device 60.

Upon actuation, a pressure is applied to a chamber 66, and the packing gland 64 is forced away from the compression seal 63, in the illustrated embodiment this direction is upwards. In a non-compressed state, the compression seal 63 is not in contact with the stem 61, and the stem 61 can move up and down, or rotate, substantially without friction from the compression seal 63.

When the slab gate, ball, or any type of valve the stem 61 is connected to, is in a fixed position (i.e. a position in which the stem is not moving or rotating), a third barrier 67 is also in contact with the stem 61. This barrier is an actuation seal 67, and in FIG. 6, a hydraulic pressure in chamber 68 forces this actuation seal 67 against the stem 61 in a direction perpendicular to the stem 61, i.e. in a radial direction of the stem 61. As such, a tight seal is created between the actuation seal 67 and the stem 61 when the actuation seal 67 is in the contact state.

The contact face of the actuation seal 67 has the shape of a half cylinder, such that two actuation barriers positioned on opposite sides of the stem 61 together form a tight seal around the circumference of the stem 61 when they are in a sealing position. It is preferred to have the actuation seal 67 as two corresponding halves, such that the two halves act from two opposite sides of the stem 61, but in alternative embodiments, the third barrier could even be divided into three or four or more equal parts encircling the stem 61. When the actuation seal 67 is to be retracted from the sealing position, the hydraulic pressure is relieved from pressure chamber 68, and a hydraulic pressure is built up in a chamber 69 which will force the actuation seal 67 away in a radial direction (to the right in FIG. 6) from the stem 61. The actuation seal 67 is retracted from the contact state until it is no longer in contact with the stem 61.

In one embodiment, the actuation barrier could be forced towards the stem (i.e. to the left in FIG. 6) by means of springs (not shown). In normal operating mode, the hydraulic pressure will force the springs to compress when the actuation barrier is retracted from the sealing position, but if a failure occurs and i.e. the hydraulic or pneumatic pressure drops, the springs will force the actuation barrier against the stem, preventing unwanted leakage.

In order to seal tightly and minimize the risk of leakage, it is beneficial to have seals of different types around a valve stem. Different types include seal which is actuated in the lengthwise direction of the stem (compression seal 63) and seal which is actuated in the radial direction of the stem (actuation seal 67). The stem seal device 60 as illustrated in FIG. 6 provides this, although any combination of such types of seals is also possible. As is appreciated by the skilled person, the second and third barriers 63, 67 could be actuated pneumatically, electrically or by other means known in the art.

While the invention has been described with reference to the embodiment(s) mentioned above, it is to be understood that modifications and variations can be made without departing from the scope of the present invention, and such modifications and variations shall remain within the field and scope of the invention,

The invention claimed is:

1. A slab gate valve seal device configured for use with a slab gate valve in a pipeline, the slab gate valve seal device comprising:

at least four moveable seats configured for sealingly contacting a slab gate, wherein two of the four movable seats are configured to be positioned on one side of the slab gate, and wherein the other two of the four movable seats are configured to be positioned on the other side of the slab gate, one of the two moveable seats on each of said sides of the slab gate being an actuation seat which is controllable from a non-contact position where it does not contact the slab gate to a contact position where it seals against the slab gate, the other of the two movable seats on each of said sides of the slab gate being a mechanical seat which is configured to be biased against the slab gate, the mechanical seat being positioned on an inside of the actuation seat;

wherein the actuation seat is arranged to be movable from the non-contact position to the contact position through actuation by hydraulic pressure;

wherein the actuation seat is further arranged to be movable away from the contact position to the non-contact position through actuation by hydraulic pressure; and wherein the slab gate valve seal device is configured such that as the slab gate is moved between an open position and closed position, the actuation seat remains in the non-contact position and the mechanical seat remains biased against and in contact with the slab gate.

2. The slab gate valve seal device according to claim 1, wherein actuation seats on both sides of the slab gate are independently controllable to eliminate downstream and upstream pressure effects.

3. The slab gate valve seal device according to claim 1, wherein at least one of the actuation seats is arranged to interact with an adjacent moveable seat, thereby controlling positioning of the adjacent moveable seat relative to the slab gate.

4. The slab gate valve seal device according to claim 3, wherein a protrusion or recess on the at least one of the actuation seats arranged to interact with the adjacent moveable seat interacts with a corresponding recess or protrusion on the adjacent moveable seat to control the position of the adjacent moveable seat relative to the slab gate.

5. The slab gate valve seal device according to claim 1, wherein a sealing seals between at least one of the actuation seats and an adjacent movable seat.

6. The slab gate valve seal device according to claim 1, wherein the mechanical seat is configured to exert contact pressure on the slab gate in use via springs.

7. The slab gate valve seal device according to claim 1, wherein at least one movable seat is arranged to be exposed to a double piston effect.

8. The slab gate valve seal device according to claim 1, wherein the slab gate valve is configured as a bi-directional valve.

9. A method of operating the slab gate valve according to claim 1, the method comprising the following steps:

a. actuating the actuation seat to move it away from the slab gate from the contact position to the non-contact position, and thereafter moving the slab gate between the open position and the closed position with the actuation seat in the non-contact position and the mechanical seat biased against and in contact with the slab gate, and b. in the open or closed position after or prior to said step a, actuating the actuation seat to move the actuation seat from the non-contact position to the contact position for contacting the slab gate.

10. The method according to claim 9, wherein in the open position or the closed position the actuation seat is in the contact position, and each of the four seats is arranged to contact and seal against the slab gate.

11. A valve seal device for a valve in a pipeline, the valve seal device comprising:

at least four moveable seats configured for sealingly contacting a valve member, two of the four seats to be positioned on one side of the valve member, and the other two of the four seats to be positioned on the other side of the valve member, at least one of the two moveable seats on each of said sides of the valve member being an actuation seat which is controllable from a non-contact position where it does not contact the valve member to a contact position where it seals against the valve member;

wherein the actuation seat is arranged to be movable from the non-contact position to the contact position through actuation by any of hydraulic, pneumatic, and electrical means;

wherein the actuation seat is further arranged to be movable away from the contact position to the non-contact position through actuation by at least one of hydraulic, pneumatic, and electrical means; and wherein at least one actuation seat is arranged to interact with an adjacent moveable seat, thereby controlling the positioning of the adjacent moveable seat relative to the valve member.

12. The valve seal device according to claim 11, wherein a protrusion or recess on the at least one actuation seat arranged to interact with an adjacent moveable seat interacts with a corresponding recess or protrusion on the adjacent moveable seat to control the position of the adjacent moveable seat relative to the valve member.

* * * * *